(No Model.)

W. H. COOK, Sr.
Pea Vine Cutter.

No. 240,664.        Patented April 26, 1881.

Witnesses
A. H. Krause
F. G. Dieterich

Inventor
William H. Cook Sr.
by Louis Bagger & Co.
Attorneys

UNITED STATES PATENT OFFICE.

WILLIAM H. COOK, SR., OF CENTREVILLE, LOUISIANA.

PEA-VINE CUTTER.

SPECIFICATION forming part of Letters Patent No. 240,664, dated April 26, 1881.

Application filed February 7, 1881. (No model.)

*To all whom it may concern:*

Be it known that I, WILLIAM H. COOK, Sr., of Centreville, in the parish of St. Mary's and State of Louisiana, have invented certain new and useful Improvements in Pea-Vine Cutters; and I do hereby declare that the following is a full, clear, and exact description of the invention, which will enable others skilled in the art to which it appertains to make and use the same, reference being had to the accompanying drawings, which form a part of this specification, and in which—

Figure 1:
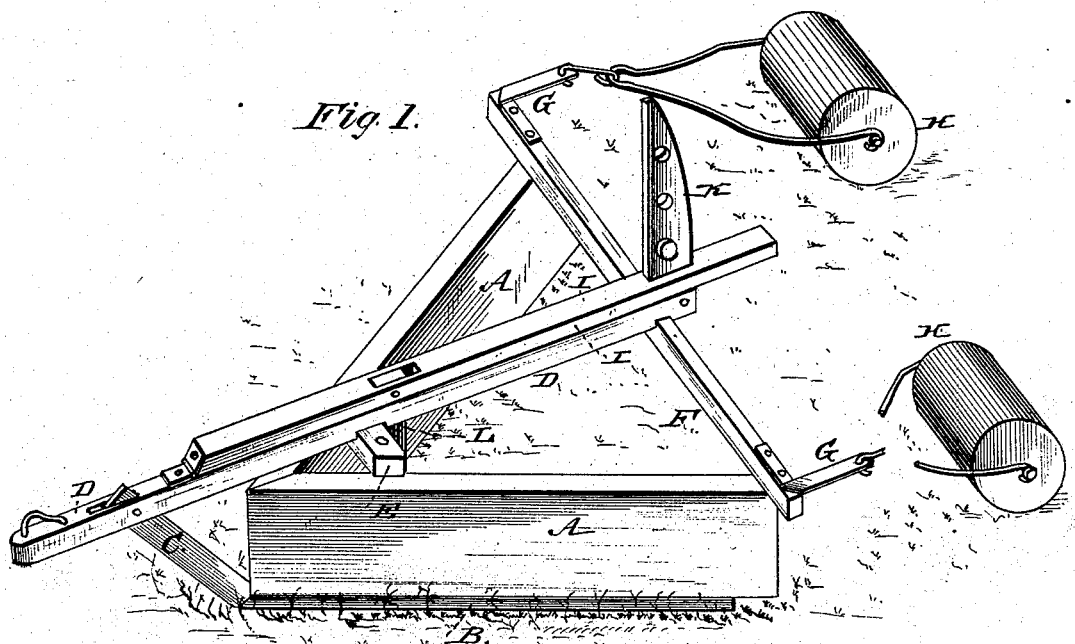
Figure 2:
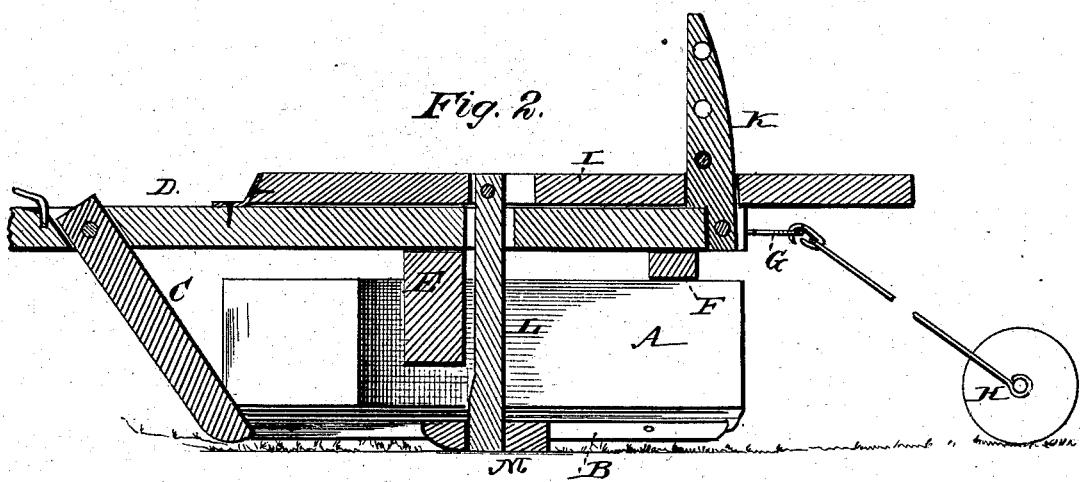

Figure 1 is a perspective view, and Fig. 2 is a longitudinal vertical section.

Similar letters of reference indicate corresponding parts in both the figures.

My invention relates to machines for cutting pea-vines and preparing the pea-field after harvesting for the plow; and it consists in the construction and combination of parts of a machine of that class, as hereinafter more fully described, and particularly pointed out in the claim.

In the accompanying drawings, A is the frame of the machine, which consists of two heavy planks of suitable width set on edge in a vertical position, and united at an angle of about sixty degrees, or more or less.

To the under side of frame A are bolted the knives or cutters B, one on each side, which project laterally and slantingly outward from the frame.

C is the colter, the lower end of which is connected to the apex or point of the meeting side knives B, while its upper end is inserted into a slot in the tongue D, which extends back the full length of frame A, to which it is secured by the cross-beams E F, the last-named of which projects out over both sides of the frame, and has rearwardly-projecting arms or brackets G G, terminating in hooks or eyes for the attachment of the detachable and self-adjustable rollers H H.

I is a lever, the forward end of which is hinged upon tongue D, while its rear end is slotted for the insertion of a segmental rack-bar, K, secured upon the rear end of the tongue, and by means of which the angle of lever I may be adjusted. About midway upon lever I is a downwardly-projecting arm, L, which works through a slot in tongue D, and has a shoe, M, at its lower end.

From the foregoing description, taken in connection with the drawings, the operation of my machine will readily be understood. The frame straddles the furrow, so that the knives slant across the ridges or hills on both sides, and cut down the vines as the machine is drawn forward. The forward inclined cutter or colter C cuts down the vines that are in the way, and the hinged and adjustable rollers H H press down the cut vines to make it easy covering with the plow. When turning at the end of the row lever I is depressed, so as to lift the machine upon the shoe M, with the knives above the ground, in which position the machine is easily turned, and all danger of breaking the knives during that operation obviated. When ready to start again lever I is again raised and the machine lowered with the knives resting upon the ridges. When meeting obstruction, or when working on a rocky field, the knife-frame may in like manner be elevated a little above the top of the ridges to avoid dulling or breaking of the knives by contact with the stones.

Having thus described my invention, I claim and desire to secure by Letters Patent of the United States—

The pea-vine cutter composed of the triangular frame A, having knives B and cross-bars E F, slotted tongue D, having rack-bar K, inclined cutter or colter C, and hinged lever I, having arm L and shoe M, all constructed and combined substantially as and for the purpose herein shown and specified.

In testimony that I claim the foregoing as my own I have hereto affixed my signature in presence of two witnesses.

WILLIAM HARRISON COOK, SR.

Witnesses:
G. G. WALKER,
T. E. KENNEDY.